United States Patent [19]

Duque

[11] Patent Number: 5,533,655
[45] Date of Patent: Jul. 9, 1996

[54] POCKET LIBERATOR HOLSTER SYSTEM

[76] Inventor: Elder F. Duque, 43-49 10th St., 3rd Fl., Long Island City, N.Y. 11101

[21] Appl. No.: 312,060

[22] Filed: Sep. 23, 1994

[51] Int. Cl.$^6$ .............................. A45F 5/00; F41C 33/02
[52] U.S. Cl. .................... 224/602; 224/257; 224/258; 224/637; 224/652; 224/655; 224/674; 224/683; 224/901.4; 224/930
[58] Field of Search ................... 224/206, 207, 224/208, 209, 210, 211, 212, 213, 214, 215, 216, 257, 258, 911, 901

[56] References Cited

U.S. PATENT DOCUMENTS

| | | | |
|---|---|---|---|
| 1,290,827 | 1/1919 | Yergason | 224/206 |
| 1,884,328 | 10/1932 | Sperling | 224/206 |
| 4,750,652 | 6/1988 | Grant | 224/206 |
| 5,246,153 | 9/1993 | Beletsky | 224/206 |
| 5,358,159 | 10/1994 | Lundie, Jr. | 224/206 |

*Primary Examiner*—Henry J. Recla
*Assistant Examiner*—Timothy L. Maust

[57] ABSTRACT

A pocket holster liberator system for harnessing portable computer and other portable electronic equipment while on the move or while operating a two wheeled vehicle. A plurality of pockets for carrying a portable computer, a beeper, a pen, and other easy to reach items. Detachable connection means is provided for releasably securing the pocket holster liberator to a users belt.

5 Claims, 3 Drawing Sheets

POCKET LIBERATOR HOLSTER SYSTEM

BACKGROUND OF THE INVENTION

Portable electrical devices are the newest concept for the businessman that is jumping into and out of vehicles all day. Portable computers, beepers, portable telephones, and radio transmitters have made business easier for those who travel throughout the day. Unfortunately, disaster always lurks with the possibility of dropping an electrical device on the pavement.

An even greater problem exists for the courier or motorcycle user. The motorcycle user often needs to pull to a stop to use a portable computer, pay a toll, retrieve an entry pass, or pull out some keys. Remembering which pocket holds a particular item is often difficult and annoying if the user is trying to hold up a bike at the same time.

Harness shoulder holsters and belt holsters are well known. Yerguson U.S. Pat. No. 1,290,827, Meyers U.S. Pat. No. 1,797,359, Moore U.S. Pat. No. 2,372,971, Soukeras U.S. Pat. No. 3,739,961, and Talavera U.S. Pat. No. 5,263,618 are prior at disclosures of shoulder supported harnesses. Talavera discloses a universal carrier having article holding pockets. However, the carrier shown and described in Talavera and the other above noted patents fail to specifically teach the concept of providing a pocket liberator for quick access to a portable computer and adjacent flashcards.

SUMMARY OF THE INVENTION

It is an object of the present invention to eliminate the problems of the prior art carrying cases by providing an improved shoulder holster for portable electronic devices, namely portable computers.

It is a further object of the present invention to provide an elastic support member that attaches an upper shoulder support to the belt of the user.

It is another object of the present invention to provide a shoulder support having a large pocket for a portable computer and a small pocket for a beeper.

In general, the pocket liberator has a left shoulder support, a right shoulder support and a yoke connector for adjustably securing the supports around the body of the user. The right shoulder support is mounted on the users body to fit under the right arm for easy access to pockets mounted on the right shoulder support.

DESCRIPTION OF THE PREFERRED EMBODIMENTS

Figure 1:
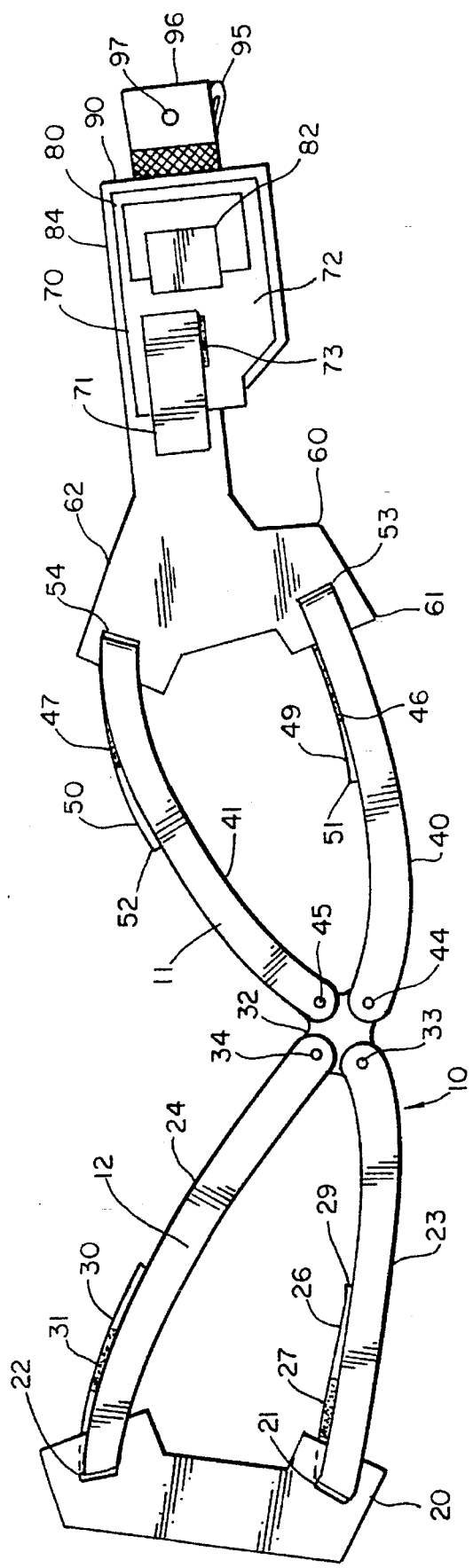
FIG. 1 is a front perspective view of the pocket liberator.
Figure 3:
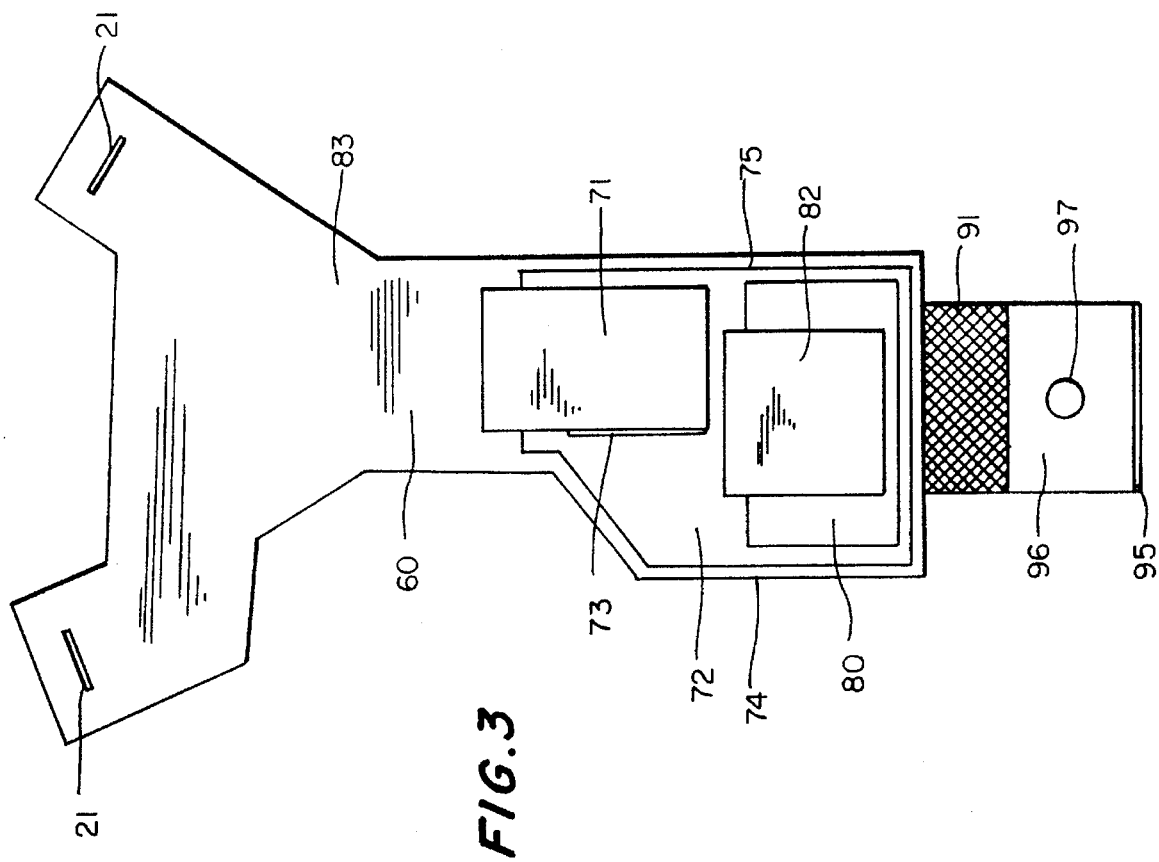
FIG. 3 is a front perspective view of a holster section of the pocket liberator.
Figure 2:
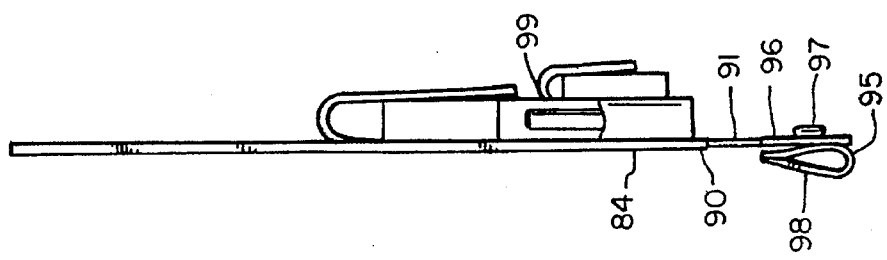
FIG. 2 is a side view of the pocket liberator.

A pocket holster liberator system is illustrated in FIG. 1 having a body (10) with a left under arm shoulder support (11) and a right shoulder support (12). Although the drawings and the specifications refer to a preferred embodiment, the subject pocket liberator could be constructed for the needs of a right handed user as opposed to a left handed user to which the drawings refer. The left shoulder support and the right shoulder support are connected by adjustable straps such that each shoulder support member is comfortable fitted for a particular wearer. Each shoulder support may be constructed of leather, polyester or neoprene.

Referring back to FIG. 1, the right shoulder support is constructed of a right bottom panel (20) having apertures (21, 22) for receiving a pair of straps (23, 24). Each strap includes VELCRO attachment means located on one side of each strap. Straps have a main hook VELCRO patch or could have broken patches of VELCRO located along the length of each strap. Front strap (23) is fitted through aperture (21) and doubled back for releasably supporting bottom panel (20). The front strap (23) includes a front side (26) with VELCRO material (27) secured thereto. One end (29) of the strap is inserted through the aperture and attached to a portion of the front side to provide an adjustable fitting. Rear strap (24) also has a front side (30) with VELCRO material (31) and is adjustably secured to front side (30) in a similar fashion. Each strap is secured to yoke means (32) by fasteners (33, 34). The yoke is clover shaped for suitably resting on the users back. Front strap (40) and left strap (41) are secured to the yoke (32) by fasteners (44, 45). Each strap has VELCRO material (46, 47) applied to front sides (49, 50). Application of VELCRO material throughout the entire length of straps (23, 24, 40, 41) provides the user with almost unlimited adjustability. Ends (51, 52) are inserted through apertures (53, 54) of holster panel member (60). The holster panel member has a Y-shaped configuration with upper end portions (61, 62).

The holster panel member (60) further includes a large pocket (70). Attached behind the large pocket is a closure flap (71) having an inner side. VELCRO connection means is secured to an inside portion of the flap. The pocket has an outside panel section (72) that includes a VELCRO connector (73) that mates with VELCRO connection means to secure the flap in a closed position. Secured to the panel section (72) of the large pocket is a small pocket (80). A closure flap (82) similarly constructed to closure flap (71) is provided for securing the flap (82) in closed position. Turning now to FIGS. 2–5, the large pocket has side panels (74, 75) which are sewn to holster panel (60). The holster panel member may be provided with a stiffening device (83) in order to provide a more steady support against vibration and jarring.

Connected at the bottom (90) of rear panel (84) is an elastic attachment means (91). One end of the elastic attachment means (91) is sewn to rear panel (84) and the other end is sewn to a belt attachment means (95). The belt attachment means (95) includes a belt flap (96) including a female snap fastener means (97). A loop section (98) is secured to the flap (96) by a male snap fastener means (99). The fastener permits the user to releasably secure the belt attachment means to the users belt. Elastic snap and pivot flap can also fold back and snap behind holster.

Figure 4:
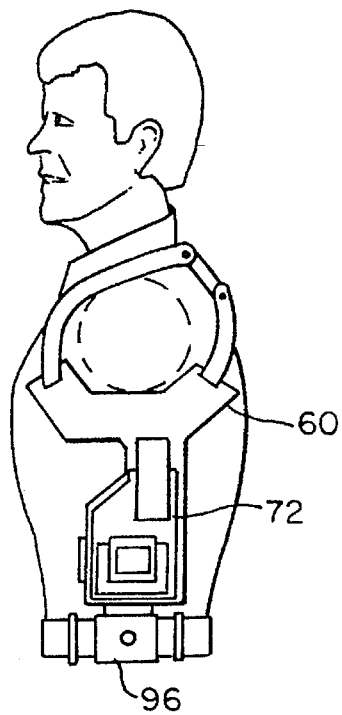
FIG. 4 is a side perspective view of the pocket liberator worn by a user.
Figure 5:
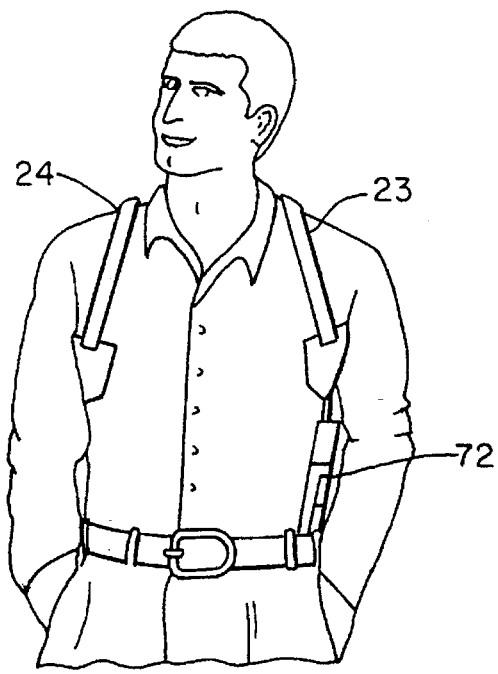
FIG. 5 is a front perspective view of the pocket liberator worn by a user.

As illustrated in FIGS. 4 and 5, the pocket liberator is secured to the users body by providing an adjustable support system designed to fit almost any users body. The large pocket could releasably support a portable computer or any comparably large electronic device. The small pocket could support a smaller electrical device such as a flashcards. A pen holder (99) is provided on a side panel of the small pocket.

The foregoing discussion of the preferred embodiment and best mode of practicing the invention are intended as examples and not intended to limit the scope of the invention as set for the in the following claims. All modifications and various embodiments within the scope of the claims are intended to be within the scope of the invention.

What is claimed:

1. A pocket liberator, comprising:

a right shoulder support, said right shoulder support having a right under arm bottom panel with apertures, a plurality of straps each having first and second opposite ends, each aperture receiving a first end of one of said straps, each strap having attachment means entirely covering one side of each strap for releasably and adjustably supporting said right panel;

a left shoulder support, said left shoulder support having a Y-shaped under arm holster panel with a plurality of pockets and upper end portions, each upper end portion having an aperture receiving first end of one of said straps, each strap having attachment means entirely covering one side of each strap for releasably and adjustably supporting said Y-shaped holster panel, said attachment means providing unlimited adjustability;

yoke means secured to the second ends of each strap whereby said supports are positionable around a user's shoulders with each strap encircling respective shoulders and said right shoulder support is adjustable with respect to said left shoulder support; and, belt loop means secured to said Y-shaped holster panel for attaching said left shoulder support to a user's belt, said belt loop means having an attachment made of elastic material.

2. The pocket liberator, as recited in claim 1, said Y-shaped holster panel having a large pocket and a small pocket, said large pocket having a closure flap.

3. The pocket liberator, as recited in claim 2, said large pocket having a small pocket connected to said large pocket, said small pocket having a closure flap.

4. The pocket liberator, as recited in claim 2, said fight shoulder support strap doubled back for releasably supporting said fight bottom panel.

5. The pocket liberator, as recited in claim 1, said shoulder supports constructed of polyester.

* * * * *